(12) United States Patent
Zhang et al.

(10) Patent No.: US 7,904,087 B2
(45) Date of Patent: Mar. 8, 2011

(54) METHOD AND SYSTEM FOR WLAN USER EQUIPMENT ACCESSING NEW OPERATION NETWORK

(75) Inventors: Wenlin Zhang, Guangdong (CN); Hai Zhang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1144 days.

(21) Appl. No.: 11/496,364

(22) Filed: Jul. 31, 2006

(65) Prior Publication Data

US 2007/0036120 A1    Feb. 15, 2007

Related U.S. Application Data

(63) Continuation of application No. PCT/CN2005/000095, filed on Jan. 21, 2005.

(30) Foreign Application Priority Data

Feb. 2, 2004 (CN) .......................... 2004 1 0000476
Apr. 9, 2004 (CN) .......................... 2004 1 0033722

(51) Int. Cl.
*H04Q 7/20* (2006.01)
(52) U.S. Cl. ......... 455/437; 455/439; 455/440; 455/433; 455/435.1
(58) Field of Classification Search .............. 455/432.1
See application file for complete search history.

(56) References Cited

U.S. PATENT DOCUMENTS

| | | |
|---|---|---|
| 5,086,640 A | 2/1992 | Nagata et al. |
| 2003/0169713 A1 | 9/2003 | Luo |

FOREIGN PATENT DOCUMENTS

| | | |
|---|---|---|
| CN | 1319296 | 10/2001 |
| CN | 1416241 | 5/2003 |

(Continued)

OTHER PUBLICATIONS

"3$^{rd}$ Generation Partnership Project; Technical Specification Group Services and System Aspects; 3GPP system to Wireless Local Area Network (WLAN) interworking; system description (3gpp ts 23.234 version 2.4.0 Release 6)" 3$^{rd}$ Generation Partnership Project (ARIB, CCSA, ETSI, T1, TTA, TTC) (On-Line) vol. 3-SA2, No. V240.

(Continued)

*Primary Examiner* — Charles N Appiah
*Assistant Examiner* — Randy Peaches
(74) *Attorney, Agent, or Firm* — Brinks Hofer Gilson & Lione (57) ABSTRACT

The present invention discloses an interactive method for a WLAN UE accessing a new operation network, which comprises: when the WLAN UE which has accessed a first Visited Mobile Communication Network needs to re-select a second Visited Mobile Communication Network to access, the WLAN UE sending authentication information to a Home Network of the WLAN UE through a WLAN Access Network and the second Visited Mobile Communication Network; after receiving the authentication information, the Home Network of the WLAN UE authenticate the WLAN UE according to the authentication information via the second Visited Mobile Communication Network, and sending an access instruction to the WLAN Access Network through the second Visited Mobile Communication Network; and on receiving the access instruction, the WLAN UE accesses the second Visited Mobile Communication Network via the WLAN Access Network. The method enables a WLAN UE to reselect another Visited Mobile Communication Network after accessing a Visited Mobile Communication Network.

17 Claims, 7 Drawing Sheets

FOREIGN PATENT DOCUMENTS

| | | |
|---|---|---|
| CN | 1429005 | 7/2003 |
| WO | 98/24247 | 6/1998 |
| WO | 98/26613 | 6/1998 |
| WO | 02/35792 A2 | 5/2002 |
| WO | 03/032658 A2 | 4/2003 |
| WO | WO03/037023 | 5/2003 |
| WO | WO 03037023 A1 * | 5/2003 |
| WO | WO2005/076532 | 8/2005 |

OTHER PUBLICATIONS

"$3^{rd}$ Generation Partnership Project; Technical Specification Group Services and System Aspects; 3GPP system to Wireless Local Area Network (WLAN) interworking; System description (EGPP TS 23.234 version 2.5.0 Release 6)" $3^{rd}$ Generation Partnership Project (ARIB, CCSA, ETSI, T1, TTA, TTC), (On-Line) vol. 3-SA2, No. V250, Mar. 2004.

Huawei: "Discussion on ?subscriber reselects WLAN AN/PLMN?" 3GPP TSG-SA2#38, TDOC S2-040652, (On-Line vol. SA2, No. 040652, Feb. 20, 2004.

"$3^{rd}$ Generation Partnership Project; Technical Specification Group Service and System Aspects; 3G security; Wireless Local Area Network (WLAN) interworking Security (3GPP TS 33.234 version 1.0.0 Release 6)" $3^{rd}$ Generation Partnership Project (ARIB, CCSA, ETSI, T1, TTA, TTC), (Online) vol. 3-SA3, No. V100, Dec. 2003.

"$3^{rd}$ Generation Partnership Project; Technical Specification Group Services and System Aspects; Network Sharing; Architecture and functional Description (3GPP TR 23.851 version 1.1.0 Release 6)" $3^{rd}$ Generation Partnership Project (ARIB, CCSA, ETSI, T1, TTA, TTC), (Online) vol. 3-SA2, No. V110, Nov. 2003.

International Preliminary Report on Patentability issued in corresponding PCT Application No. PCT/CN2005/000095; issued Aug. 7, 2006.

Summons to Attend Oral Proceedings issued in corresponding European Patent Application No. 05 700 469.9; dated Mar. 10, 2010.

Office Action issued in corresponding European Patent Application No. 05 700 469.9; dated Jul. 27, 2007.

Office Action issued in corresponding Japanese Patent Application No. 2006-549836; mailed May 22, 2009.

* cited by examiner

METHOD AND SYSTEM FOR WLAN USER EQUIPMENT ACCESSING NEW OPERATION NETWORK

CROSS REFERENCES TO RELATED APPLICATIONS

This application is a continuation of International Application No. PCT/CN2005/000095, filed on Jan. 21, 2005, which claims priorities to Chinese Patent Application No. 200410000476.1, filed on Feb. 2, 2004 and Chinese Patent Application No. 200410033722.3, filed on Apr. 9, 2004, both of which are hereby incorporated by reference in their entireties.

FIELD OF THE TECHNOLOGY

The present invention relates to operation network selection technology, and more specifically relates to a method for a User Equipment (UE) in Wireless Local Area Network (WLAN) reselecting a new operation network and a system thereof.

BACKGROUND OF THE INVENTION

As users' requirements on the wireless access rate are becoming higher and higher, WLAN which is able to provide a higher wireless access rate of data in a relatively small area has emerged as the times require. WLAN involves various kinds of techniques, the most extensively used technical standard of which is IEEE 802.11b, which uses the frequency band of 2.4 GHz and the data transmission rate of which is up to 11 Mbps. Other technical standards using the same frequency band include IEEE 802.11g and Bluetooth, wherein, the data transmission rate of IEEE 802.11g is up to 54 Mbps. Other new standards of WLAN, such as IEEE 802.11a and ETSI BRAN Hiperlan2, use the frequency band of 5 GHz, and the transmission rate of which can be up to 54 Mbps as well.

Although WLAN involves various kinds of wireless access techniques, most WLAN techniques utilize IP data packets for data transmission. The specific WLAN access technique adopted by a wireless IP network is usually transparent to the upper IP level. Such a wireless IP network is usually configured with Access Points (AP) for implementing wireless access of a WLAN UE, and with controlling and connecting devices for implementing IP data transmission.

Figure 1:
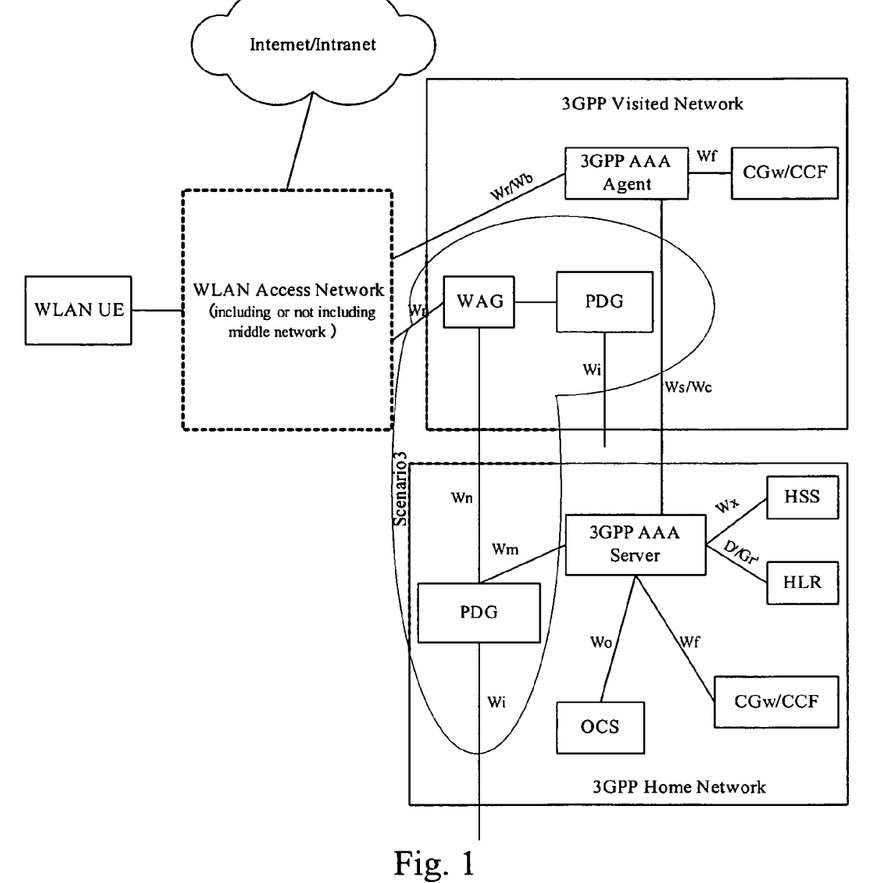
FIG. 1 is a schematic diagram illustrating a network structure of an inter-working network of a WLAN and a 3GPP system in the case of roaming.
Figure 2:
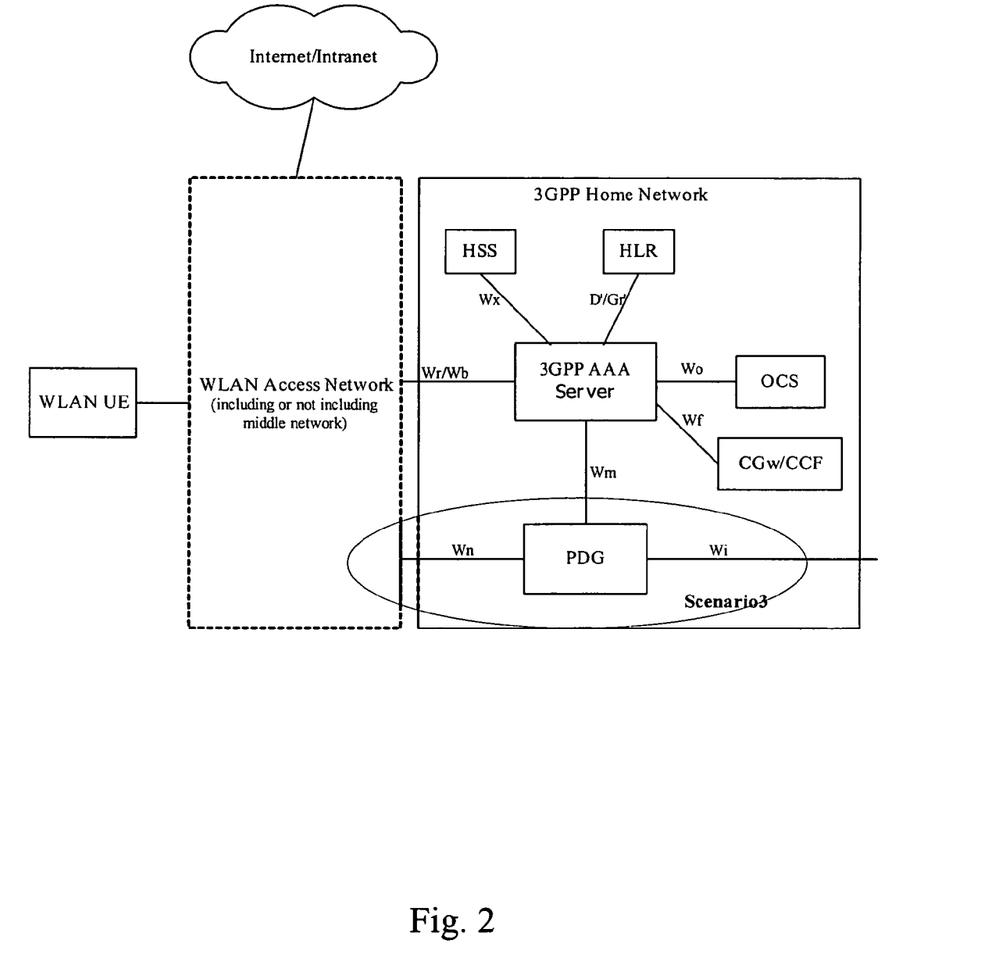
FIG. 2 is a schematic diagram illustrating a network structure of an inter-working network of a WLAN and 3GPP system in the case of non-roaming.

Along with the appearance and development of WLAN, the inter-working of WLAN with various wireless mobile communication networks, such as GSM, CDMA, WCDMA, TD-SCDMA, and CDMA2000 has become the focus of research. This interworking network of WLAN and wireless mobile communication networks can also be called interworking-WLAN (I-WLAN). The invention is applied to, but not limited to I-WLAN. In accordance with the 3GPP ($3^{rd}$ Generation Partner Project) standards, a WLAN UE is not only able to connect with Internet and Intranet via the access network of WLAN, but also able to connect with the home network and the visited network of a 3GPP system via the WLAN Access Network. To be specific, when accessing locally, the WLAN UE is able to connect to the 3GPP Home Network via the WLAN Access Network, as shown in FIG. 2; when in case of roaming, the WLAN UE is able to connect to the Visited Network of the 3GPP system via the WLAN Access Network. And as some entities of the 3GPP Visited Network are connected with some corresponding entities of the 3GPP Home Network, for instance, the 3GPP Authentication, Authorization and Accounting (AAA) Proxy in the 3GPP Visited Network is connected with the 3GPP AAA Server in the 3GPP Home Network, the WLAN Access Gate (WAG) in the 3GPP Visited Network is connected with the Packet Data Gateway (PDG) in the 3GPP Home Network, and etc., as shown in FIG. 1. Wherein, FIG. 1 and FIG. 2 respectively illustrate the architecture of an inter-working network of a WLAN system and a 3GPP system under roaming and non-roaming circumstances.

As shown in FIG. 1 and FIG. 2, a 3GPP system primarily comprises Home Subscriber Server (HSS)/Home Location Register (HLR), 3GPP AAA Server, 3GPP AAA Proxy, WAG, PDG, Charging Gateway (CGw)/Charging information Collecting Function (CCF) and Online Charging System (OCS). WLAN UEs, WLAN access network, and all the entities of the 3GPP system together construct a 3GPP-WLAN inter-working network, which can be used as a WLAN service system. In this service system, 3GPP AAA Server is in charge of the authentication, authorization, and accounting of a WLAN UE, collecting the charging information sent from the WLAN access network and sending the charging information to the charging system; the PDG is in charge of the transmission of the user's data from the WLAN Access Network to the 3GPP network or other packet switching networks; and the charging system is in charge of receiving and recording the user's charging information sent from the network, and the OCS takes charge of instructing the network to periodically send online charging information in accordance with the expenses of the online charged users, meanwhile collecting statistics and controlling the network.

In the case of non-roaming, when a WLAN UE desires to access the Internet/Intranet directly, the WLAN UE can access to the Internet/Intranet via the WLAN Access Network after an authentication process with an AAA server (AS) via the WLAN Access Network. If the WLAN UE desires to access the services of 3GPP PS domain as well, it should further request the services of Scenario 3 from the 3GPP Home Network, which comprises: the WLAN UE sends a Service Authorization Request of Scenario 3 to the AS of the 3GPP Home Network, and the AS performs authentication and authorization to the Service Authorization Request, if the authentication and authorization are successful, the AS sends an Access Permission Message to the WLAN UE and assigns a corresponding PGD for the WLAN UE. After establishing a tunnel with the assigned PDG, the WLAN UE can access 3GPP PS domain services. At the same time, CGw/CCF and OCS records accounting information according to the use of network by the WLAN UE. In case of roaming, if a WLAN UE desires to access the Internet/Intranet directly, the WLAN UE will make a request to the 3GPP Home Network via the 3GPP Visited Network for accessing the Internet/Intranet. If the WLAN UE desires to access 3GPP PS domain, services requesting a Scenario 3 services as well, the WLAN UE needs to initiate a Service Authentication procedure via the 3GPP Visited Network to 3GPP Home Network, and similarly, the procedure is also implemented between the WLAN UE and the AS of the 3GPP Home Network. After the authentication procedure succeeds, the AS assigns a corresponding Home PGD for the WLAN UE, and after a tunnel with the assigned PDG is established via the WAG of 3GPP access network, the WLAN UE can access 3GPP PS domain services.

Figure 3:
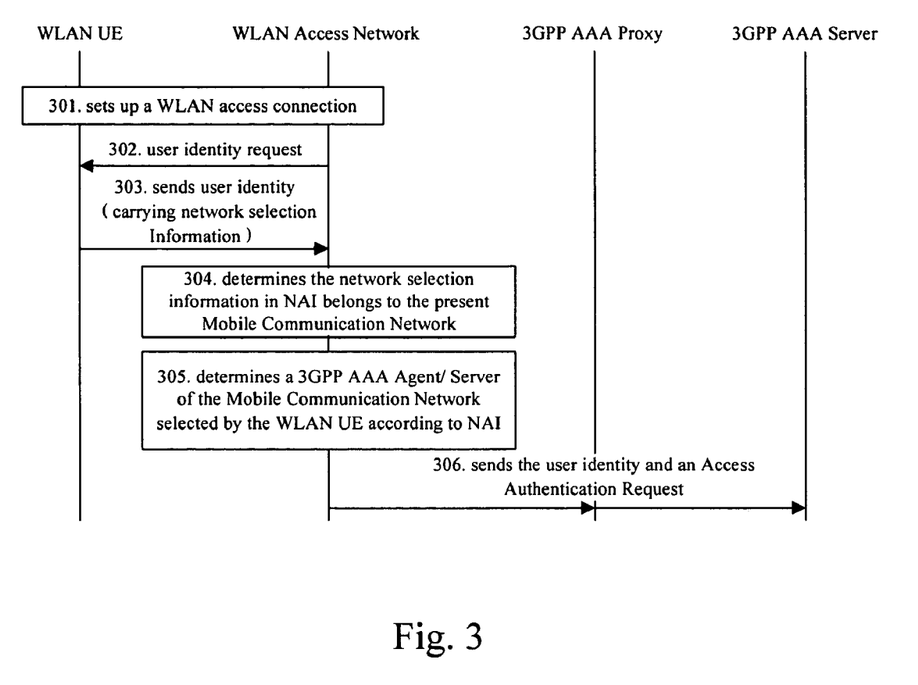
FIG. 3 is a flow chart illustrating the process of a WLAN UE selecting a Mobile Communication Network to access according to an embodiment of the present invention.
Figure 4:
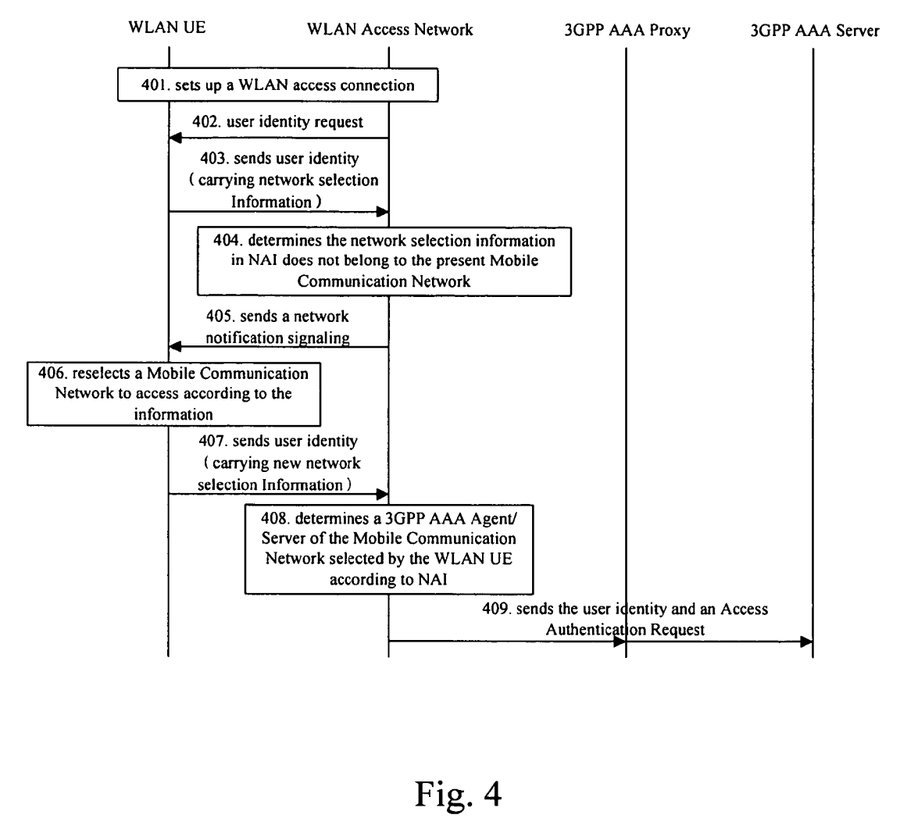
FIG. 4 is a flow chart illustrating the process of a WLAN UE selecting a Mobile Communication Network to access according to another embodiment of the present invention.

In 3GPP-WLAN inter-working networks, if a WLAN UE connects with multiple 3GPP Visited Networks, which refer to a plurality of Mobile Communication Networks, there are two schemes, as shown in FIG. 3 and FIG. 4 respectively, for the WLAN UE selecting a proper Mobile Communication Network to access according to its own requirements. FIG. 3 represents a successful process illustrating the WLAN UE directly selecting a Mobile Communication Network to access, which comprises:

Step 301-303: After establishing a wireless connection between the WLAN UE and a WLAN Access Network, the network or the WLAN UE initiates an access authentication procedure, the WLAN Access Network sends a User Identity Request packet to the WLAN UE; and after receiving the request packet, the WLAN UE returns a User Identity Response packet carrying network selection information to the WLAN Access Network. Here, the network selection information refers to the information of the Mobile Communication Network connected with the WLAN network and also to be accessed by the current WLAN UE; the access authentication procedure between the WLAN Access Network and the WLAN UE is based on an Expandable Authentication Protocol (EAP) procedure. In general, the network selection information is carried in a User Identity Field defined by a Network Access Identity (NAI) format.

Step 304-306: After receiving the packet sent from the WLAN UE, the WLAN Access Network judges whether the network selection information in the packet belongs to the Mobile Communication Network currently connected with the WLAN, if yes, the WLAN Access Network determines a 3GPP AAA Agent or a 3GPP AAA Server of the Mobile Communication Network selected by the WLAN UE according to NAI, and then sends the user identity and an Access Authentication Request to the determined 3GPP AAA Agent or 3GPP AAA Server, making 3GPP AAA Agent or 3GPP AAA Server authenticate to the currently accessing WLAN UE; if the authentication is passed, the subsequent access procedure will be accomplished.

FIG. 4 represents a process illustrating a WLAN UE reselecting a Mobile Communication Network to access according to the sent network selection information when the first selection fails, which comprises:

Step 401-403: These steps are exactly the same as Step 301-303.

Step 404-405: After receiving the packet sent from the WLAN UE, the WLAN Access Network finds that the network selection information in the packet does not belong to the Mobile Communication Network currently connected with the WLAN Access Network, and then sends a network notification signaling containing the information of all the Mobile Communication Networks connected with it to the WLAN UE.

Step 406-407: On receiving the signaling, the WLAN UE reselects a Mobile Communication Network to access according to the information of the Mobile Communication Networks contained in the information signaling, and then sends a User Identity Response packet carrying the selection information of the newly selected network to the WLAN Access Network.

Step 408-409: These steps are exactly the same as Step 305-306.

It can be seen from above schemes, there has been a relative consummate flow for a WLAN UE to select an access network in 3GPP-WLAN inter-working networks, however, when a WLAN Access Network connects with a plurality of VPLMN at the same time, and after a certain WLAN UE has accessed one of these VPLMN networks through the WLAN Access Network, the WLAN UE may need to disconnect the VPLMN network it currently connects and reselect another VPLMN network connected with the WLAN Access Network due to different reasons, such as charge, range of access service and so on; or the current WLAN UE expects to access Service A through VPLMN1 and access Service B through VPLMN2 at the same time. No specific scheme is proposed at present to resolve the above problems.

SUMMARY OF THE INVENTION

The technical scheme of the present invention is implemented as follows:

An interactive method for a WLAN UE accessing a new mobile communication network, which comprises:

when the WLAN UE accessing a first Visited Mobile Communication Network needs access a second Visited Mobile Communication Network, the WLAN UE sending authentication information to the Home Network where the WLAN UE locates via a WLAN Access Network and the second Visited Mobile Communication Network;

upon receiving the authentication information, the Home Network authenticating the WLAN UE according to the authentication information and sending an access instruction to the WLAN Access Network via the second Visited Mobile Communication Network; and upon receiving the access instruction, the WLAN UE accessing the second Visited Mobile Communication Network via the WLAN Access Network.

A system for a WLAN UE accessing a new communication network according to the second aspect of the present invention, comprising:

a system component, configured to when the WLAN UE accessing a first Visited Mobile Communication Network needs access a second Visited Mobile Communication Network, the WLAN UE sends authentication information to the Home Network where the WLAN UE locates via a WLAN Access Network and the second Visited Mobile Communication Network;

upon receiving the authentication information, the Home Network authenticates the WLAN UE according to the authentication information and sends an access instruction to the WLAN Access Network via the second Visited Mobile Communication Network; and upon receiving the operation indication, the WLAN UE accesses the second Visited Mobile Communication Network via the WLAN Access Network.

The interactive method for a WLAN UE re-selecting an operation network according to the present invention introduces only a little modification to the AAA Server in the Home Network of current WLAN UE, and enables the AAA Server to cooperate with the existing selection procedure of a WLAN PLMN to accomplish the Visited Mobile Communication Network re-selection by the WLAN UE.

In the technical scheme disclosed by the present invention, the WLAN Access Network can directly implement authentication and access procedure with the new Visited Mobile Communication Network without disconnecting the connection with the former Visited Mobile Communication Network, thus the connection time of disconnecting the WLAN UE and external services is shortened or even eliminated, and a smooth re-selection procedure of Visited Communication Network is realized. Moreover, the present invention also provides a WLAN UE establishing multiple connections through different PLMNs, which may not only improve the satisfaction of clients, but also increase the accuracy of charging and subsequently protect the profit of operators.

In addition, the present invention just introduces a few small modifications or adds relatively a little function demand to each network entity, such as the WLAN UE, the WLAN Access Network and the AAA Server, which has little effect on the existing process flow. Therefore, the present invention not only can realize the re-selection function of accessed operation network for WLAN UE but also has very strong practicability. Moreover, the present invention has multiple implementation substitutes, thus the implementation of the present invention can be very flexible.

DETAILED DESCRIPTION OF THE INVENTION

In order to make the object, the technical scheme and the advantages of the present invention clearer and more obvious, the present invention will be described in detail hereinafter with reference to embodiments and accompanying drawings.

The basic idea of the present invention is: a WLAN UE needing to reselect a Visited Mobile Communication Network, initiate an authentication process to the Home Network of the WLAN UE via a WLAN Access Network and the newly selected Visited Mobile Communication Network, which is reselected by the WLAN UE and connected with the present WLAN; and after receiving the authentication request, the Home Network determines whether to disconnect the connection between the WLAN UE initiated request and the former Visited Mobile Communication Network according to the correlative authentication information stored in advance, authentication result and the circumstances of whether the current WLAN UE is permitted to have more than one connection simultaneously; and determines whether to set up a connection between the WLAN UE initiated request and the new Visited Mobile Communication Network. Thus the access of the WLAN UE to the reselected new Visited Mobile Communication Network is completed. Here, the correlative authentication information stored in advance refers to user subscription information, network access rules set in advance and so on.

In the present invention, the precondition of a WLAN UE implementing network reselection is that the WLAN UE has currently accessed a Visited Mobile Communication Network, which is called a first Visited Mobile Communication Network. Here, the Visited Mobile Communication Network currently accessed can be an access network, which is called a middle operation network, connecting the WLAN UE and its Home Network, such as a VPLMN; it also can be an HPLMN of the current WLAN UE. Wherein, the entity implementing authentication in the Home Network of the WLAN UE can be an AAA Server, more over, in 3GPP-WLAN inter-working network, the entity is a 3GPP AAA Server.

There are several reasons for a WLAN UE reselecting a Visited Communication Operation Network called a second Visited Mobile Communication Network, for example, the charge of the currently accessed Visited Mobile Communication Network is higher than that of another Visited Mobile Communication Network, in this case the WLAN UE may desire to switch from the currently accessed Visited Mobile Communication Network to the another Visited Mobile Communication Network. In another case, the currently accessed Visited Mobile Communication Network has some restriction for the WLAN UE to access Internet, and the WLAN UE may desire to switch from the currently accessed Visited Mobile Communication Network to another Visited Mobile Communication Network. In still another case, the currently accessed Visited Mobile Communication Network can not provide the interaction ability with certain services in PLMN, but another Visited Mobile Communication Network can provide such ability; or in still another case, although the charge of the currently accessed Visited Mobile Communication Network is relatively cheap, while the data transmission rate of it is slow, and high-speed access is needed in practical applications, thus the WLAN UE may need to reselect a more expensive Visited Mobile Communication Network with a higher-speed data rate. For example, the switch mentioned above can be a switch from its HPLMN to a VPLMN, or a switch from VPLMN1 to VPLMN2, or a switch from a VPLMN to the HPLMN.

If the current WLAN UE is permitted to support multiple connections simultaneously, for example, the WLAN UE accesses HPLMN through two different VPLMN, VPLMN1 and VPLMN2 simultaneously, then the WLAN UE can access Internet using VPLMN1 with a cheaper charging; while for SMS service that is not supported by VPLMN1, the WLAN UE can adopt VPLMN2 supporting SMS service at the same time. Under this circumstance, VPLMN1 and VPLMN2 charge the WLAN UE respectively according to the services implemented, and the WLAN UE can select either VPLMN1 or VPLMN2 to access a certain service making use of different NAI identities. Here, the multiple connections supported simultaneously can be connections with HPLMN and VPLMN, or connections with different VPLMNs: VPLMN1, VPLMN2 . . . VPLMNn.

Figure 5:
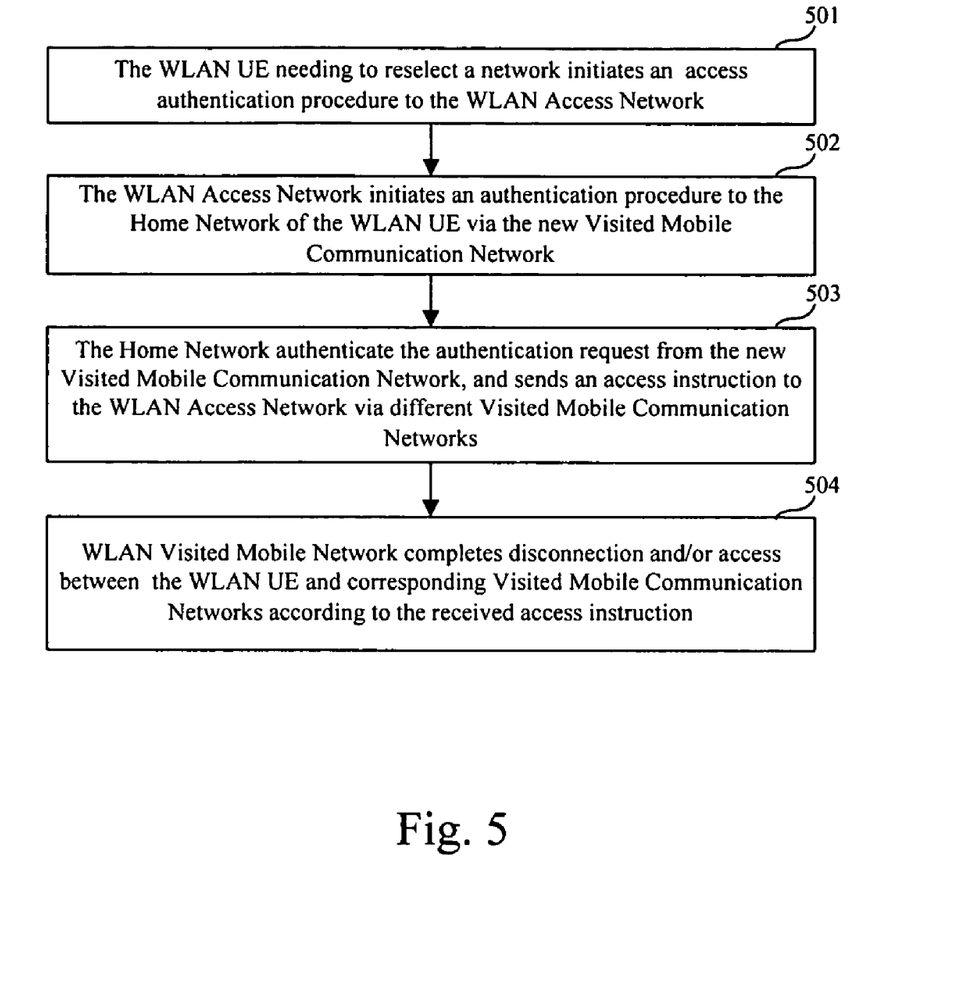
FIG. 5 is a flow chart illustrating the method according to the present invention.

As shown in FIG. 5, the process of a WLAN UE reselecting a Mobile Communication Network according to the present invention comprises the following steps:

Step 501: On determining a reselected Visited Mobile Communication Network, the WLAN UE needing to select a new Visited Network initiates an access authentication process to the WLAN Access Network, and sends the information of the newly selected Visited Mobile Communication Network to the WLAN Access Network. Wherein, the information of the newly selected Visited Mobile Communication Network can be carried in the request message and sent to the WLAN Access Network directly; alternatively, it can also be sent to the WLAN Access Network through response packet during an EAP procedure between the WLAN Access Network and the WLAN UE.

Step 502: On receiving the request of the WLAN UE, the WLAN Access Network initiates an authentication request to the Home Network of the current WLAN UE via the Visited Mobile Communication Network newly selected to access by the WLAN UE.

Step 503: On receiving the authentication request, the Home Network implements an authentication operation for the authentication request from the Visited Mobile Communication Network newly selected by the current WLAN UE, and sends an access instruction to the WLAN Access Network through different Visited Mobile Communication Networks, that is, through the accessed Visited Mobile Communication Network and the newly selected Visited Mobile Communication Network.

Step 504: On receiving the access instruction sent from the Home Network of the WLAN UE, the WLAN Access Network completes disconnection and/or access process between the WLAN UE and the corresponding Visited Mobile Communication Network according to the access instruction.

The Visited Mobile Communication Network mentioned in the present invention can be a Mobile Communication Network or other Cable Communication Operation Networks. Hereinafter, the implementation procedure of the method according to the present invention will be illustrated in more detail taking a Mobile Communication Network as an example, and the implementation procedures of other Communication Networks are basically similar to that of the Mobile Communication Network.

Figure 6:
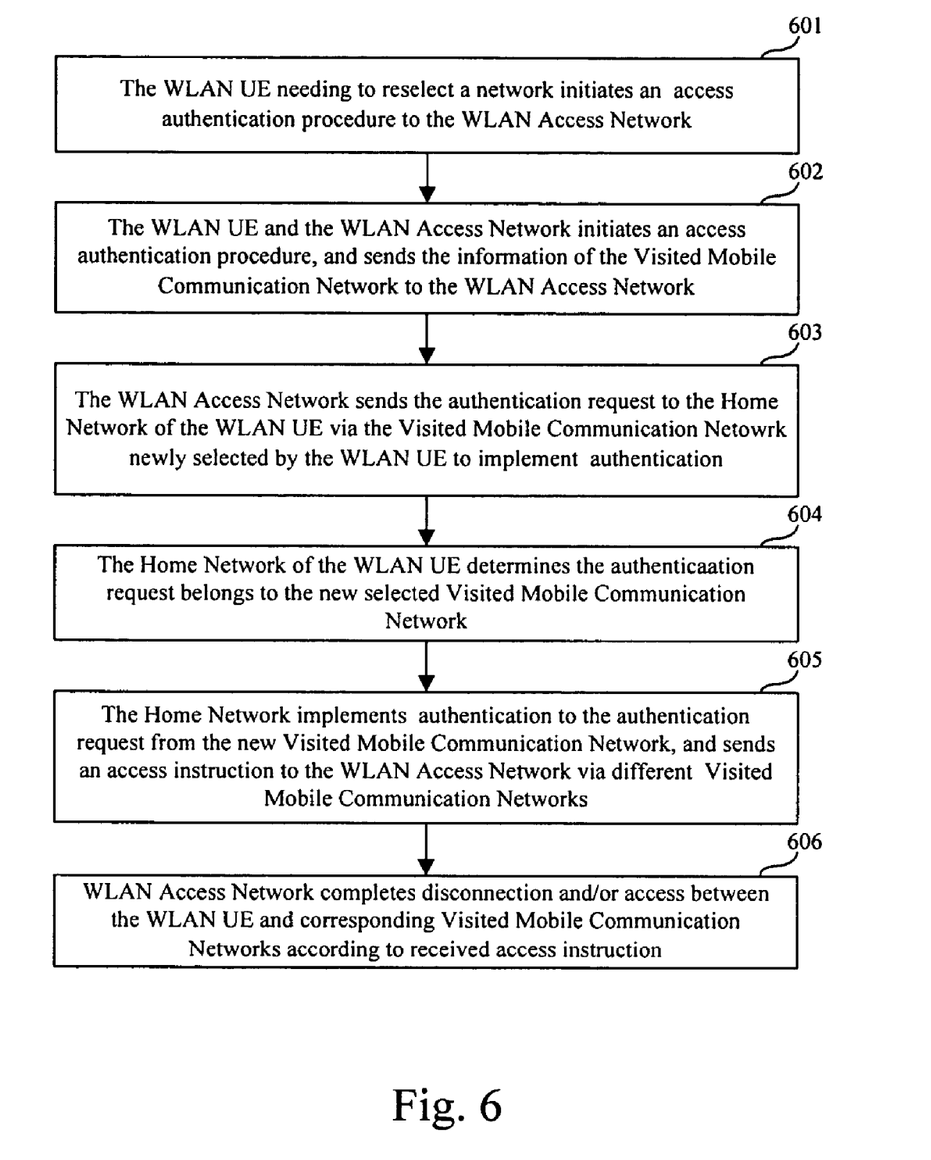
FIG. 6 is a flow chart illustrating the method according to a specific embodiment of the present invention.

The specific implementation procedure of a WLAN UE reselecting a Mobile Communication Network is shown in FIG. 6, which comprises the following steps:

Step 601: The WLAN UE needing to reselect a new Access Network determines a newly selected Mobile Communication Network to access; then the WLAN UE sends an Access Authentication Request to the WLAN Access Network, expressing that the WLAN UE needs to access the new Mobile Communication Network. For example, selecting VPLMN2 while already connecting with VPLMN1 indicates that the WLAN UE desires to access HPLMN via the new VPLMN2, if the newly selected network is HPLMN, it means the WLAN UE desires to access HPLMN directly. Here, the WLAN UE can select to switch from an existing connection to a new connection, and it can also select to support two or a plurality of connections simultaneously according to network ability and/or subscription information.

Wherein, the 3GPP Mobile Communication Network currently accessed by the WLAN UE can be a Visited Network or a Home Network of the WLAN UE.

Step 602: After the WLAN Access Network receives the Access Authentication Request, an access authentication procedure is implemented between the WLAN Access Network and the WLAN UE, i.e. an EAP procedure is taken, more specifically: the WLAN Access Network sends a Request UID packet to the WLAN UE; and on receiving the request packet, the WLAN UE sends a UID Response packet containing the information of the newly selected Mobile Communication Network to the WLAN Access Network. In the same way, the information of a Mobile Communication Network can be set in the UID field with the NAI format.

Step 603: Via the Mobile Communication Network newly selected by the current WLAN UE, the WLAN Access Network sends the Access Authentication Request to the Home Network of the current WLAN UE to implement authentication, which specifically comprises: the WLAN Access Network sends the Access Authentication Request to an AAA Agent of the new Mobile Communication Network; and after receiving the request, the AAA Agent sends an authentication request to the AAA Server in the Home Network of the WLAN UE, and subsequently the authentication procedure is implemented by the AAA Server.

Step 604-606: On receiving the authentication request, the Home Network of the WLAN UE determines whether the request is an authentication request from the newly selected Mobile Communication Network according to the information in the request, if the request is an authentication request via the newly selected Mobile Communication Network the Home Network implements an authentication operation to the authentication request from the Mobile Communication Network newly selected by the current WLAN UE, and sends an access instruction to the WLAN Access network through different Mobile Communication Networks, i.e. through the accessed Mobile Communication Network and the newly selected Mobile Communication Network; and after receiving the Home Network operation indication from the current WLAN UE, the WLAN Access Network completes a disconnection and an access operation between the WLAN UE and corresponding Mobile Communication Networks.

The information in the request in Step 604 refers to address information of a VPLMN or a VPLMN ID or other. For example: since the Home Network stores all the information of the currently accessed Mobile Communication Network, the Home Network can judge whether the source address in the request is the same as the address of the currently accessed Mobile Communication Network. And if the two addresses are not the same, it means that the request is an authentication request from a newly selected Mobile Communication Network.

In fact, an alternative case in Step 604 is that the Home Network does not need to judge whether the request is an authentication request from the newly selected Mobile Communication Network, and it implements authentication to the received authentication request directly.

In Step 604, before implementing the authentication, the Home Network can first judge whether the current WLAN UE is permitted to access multiple connections simultaneously. Wherein, the judgment is based on the data configured in advance by the operators or the data of the user subscription information. The data configured may include that whether the network permits the WLAN UE to have multiple connections, whether the network permits users with certain characteristics to have multiple connections or whether the network forbids users with other certain characteristics to have multiple connections; in addition, whether multiple connections to certain VPLMNs are forbidden, if so, a list of VPLMNs under these circumstances is needed. If the judgment is implemented according to each user, the corresponding parameters are needed in the user subscription information, which may include whether the user permits multiple connection accesses from different VPLMNs, whether the permitted multiple connections comprise HPLMN, and the maximum number of the permitted simultaneous connections and so on.

If the current WLAN UE is permitted to access only one VPLMN connection simultaneously, the process done to the newly selected network in Step 605 and 604 can actually be divided into two cases:

In one case, the Home Network sends a Disconnection message to the former Mobile Communication Network and disconnects the former connection between the former Mobile Communication Network and the current WLAN UE, then implements authentication to the authentication request from the new Mobile Communication Network. In this case, the WLAN Access Network determines whether to access the new Mobile Communication Network according to the authentication result. And next completes subsequent operations, and then completes the current flow of reselecting a network. That is, if the authentication fails, an Access Failure message will be returned to the WLAN UE, which may contain failure reasons; if the authentication succeeds, the WLAN Access Network will set up a normal connection between the WLAN UE and the new Mobile Communication Network, establishes a corresponding charging relationship between the WLAN Access Network and the new Mobile Communication Network, and thus completes the procedure of the WLAN UE reselecting a Mobile Communication Network.

In the other case, the Home Network implements authentication to the authentication request from the new Mobile Communication Network directly, and determines the Mobile Communication Network to be finally accessed by the current WLAN UE according to the authentication result and corresponding authentication information, and then the Home Network sends an authentication result to the WLAN Access Network; the WLAN Access Network completes the subsequent disconnection and/or access operations according to the received signaling indications. In this case, the subsequent operations of the WLAN Access Network can be further divided into three cases:

a) The authentication implemented by the Home Network to the authentication request from the new Mobile Communication Network fails. In this case, the Home Network should differentiate whether the failure is a failure of an authentication to the current WLAN UE, which can be judged with respect to the failure reasons. If the failure is a failure of an authentication to the current WLAN UE, the Home Network may reject to set up a connection between the WLAN UE and the new Mobile Communication Network, and at the same time may disconnect the connection between the WLAN UE and the former Mobile Communication Network. Alternatively, the Home Network can also only reject to set up a connection between the WLAN UE and the new Mobile Communication Network; in view of another substitute, the Home Network can also reject to set up a connection between the WLAN UE and the new Mobile Communication Network and at the same time request the former Mobile Communication Network to implement authentication to the current WLAN UE once again.

Otherwise, the Home Network can only reject to set up a connection between the WLAN UE and the new Mobile Communication Network, and keep the connection between the WLAN UE and the former Mobile Communication Network. Alternatively, the Home Network can also implement authentication to the authentication request from the new Mobile Communication Network once again.

b) The Home Network judges whether the authentication request via the new Mobile Communication Network is permitted to pass according to the network access rules or user subscription information set in advance, and if it is not permitted, the Home Network sends an authentication failure message to the new Mobile Communication Network, and keeps the connection between the WLAN UE and the former Mobile Communication Network. For example, the network access rule set in advance includes that accessing another Mobile Communication Network simultaneously after accessing one Mobile Communication Network is not permitted, and then the authentication request via the new Mobile Communication Network will not be permitted to pass. For another example, the user subscription information indicates that accessing more than one Access Network simultaneously is not permitted, and then the authentication request from the new Mobile Communication Network will not be permitted to pass. That is, the Home Network can forbid the WLAN UE to access two Mobile Communication Networks simultaneously according to the practical situation of the WLAN UE.

c) The authentication to the WLAN UE succeeds. In this case, the Home Network sends an Access Permission message to the new Mobile Communication Network, and then sends a Disconnection message to the former Mobile Communication Network. Specifically, the Home Network can send the Access Permission message first and then send the Disconnection message. Alternatively, it can also send the Access Permission message and the Disconnection message at the same time. Or, the Home Network can only send the Access Permission message to the new Mobile Communication Network. According to the above Case c, accordingly, the process of the WLAN Access Network also comprises three cases:

c1) If the WLAN Access Network receives the Access Permission message from the new Mobile Communication Network first, the WLAN Access Network collects charging information and sends the charging information to the former Mobile Communication Network, and then disconnects the network connection between the current WLAN UE and the former Mobile Communication Network; at the same time, the WLAN Access Network sets up a normal network connection between the current WLAN UE and the new Mobile Communication Network, and establishes a corresponding charging relationship with the new Mobile Communication Network, and the subsequent charging information should be sent to the new Mobile Communication Network and thus, the network reselecting operation of the WLAN UE is completed.

c2) If the WLAN Access Network receives the Disconnection message from the former Mobile Communication Network, the WLAN Access Network can collect the charging information and send the charging information to the former Mobile Communication Network directly, then disconnects the current WLAN UE and the former Mobile Communication Network, and next waits for the authentication result from the new Mobile Communication Network. After receiving the authentication result, the WLAN Access Network sets up a normal network connection between the current WLAN UE and the new Mobile Communication Network and establishes a corresponding charging relationship with the new Mobile Communication Network, thus the subsequent charging information is to be sent to the new Mobile Communication Network and then the network reselecting operation of the WLAN UE is completed.

The WLAN Access Network can also wait for authentication result from the new Mobile Communication Network first; and after receiving the authentication result, the WLAN Access Network collects the charging information and sends it to the former Mobile Communication Network, and then disconnects the network connection between the current WLAN UE and the former Mobile Communication Network, At the same time, the WLAN Access Network sets up a normal network connection and a corresponding charging relationship for the current WLAN UE and the new Mobile Communication Network, thus the subsequent charging information is to be sent to the new Mobile Communication Network and then completes the network reselecting operation of the WLAN UE.

c3) If the WLAN Access Network receives the Disconnection signaling generated due to authentication failure, the WLAN Access Network first collects the charging information and sends it to the former Mobile Communication Network, then disconnects the network connection between the current WLAN UE and the former Mobile Communication Network, and then waits for authentication result from the new Mobile Communication Network; if the Access Permission message is received, the corresponding operations will be implemented according to Case c1; and if the authentication result is not received, tries to implement the authentication process once again.

If the current WLAN UE is permitted to access multiple VPLMN connections simultaneously, for example, the current WLAN UE sets up a connection of WLAN-VPLMN1-HPLMN, and at the same time, it also sets up a connection of WLAN-VPLMN2-PLMN. Here, the Home Network or the WLAN Access Network of the current WLAN UE will determine whether to disconnect the existing connection according to the user subscription information, network setting or user selection. If it determines not to disconnect the existing connection, on one hand, the AAA will judge whether the connection is within the range of the multiple connections, and if so, the AAA will implement normal authentication and access authentication operations for the new connection and indicate WLAN to access the WLAN UE after the authentication is successful. On the other hand, it also needs to implement an operation of affirming the existing connection is continued to be used. This operation can be completed in more than one ways, for example, a) implements a re-authentication to the WLAN UE through the Mobile Communication Network that the current WLAN UE has accessed; b) indicates the current WLAN UE that there are multiple connections exist in itself, here the indication can be sent through established connections, the new established connection or any other connections between the network and the WLAN UE, and the total number of the current connections and/or specific connection selection such as a list of selected and accessed VPLMN and so on can be indicated in the indication information; c) does nothing.

If a threshold of the number of multiple connections is set in advance and after the new connection to be established by the WLAN UE is established, the number of connections exceeds the threshold of the maximum number of multiple connections, the request of the new connection will be rejected; or the user will be prompted to select a connection to be removed, i.e. select a connection to be removed among the current established connections. Here, the network can disconnect the corresponding accessed Visited Mobile Communication Network or reject the newly selected Visited Mobile Communication Network according to user's response, and the network also can appoint a connection to be removed and let the user affirm.

In the above schemes, the step of disconnecting the connection between the Mobile Communication Network and the WLAN UE further comprises: disconnecting the service connection, settling accounts of charging information and so on, the specific process is exactly the same as the existing procedure of disconnecting connection between the WLAN UE and the Mobile Communication Network connected with the WLAN UE.

In the above schemes, after receiving the Access Permission message from the new Mobile Communication Network, the WLAN Access Network can first do each preparative operation of the WLAN UE and the new Mobile Communication Network, such as the new Mobile Communication Network completing resource distribution, parameters configuration and so on, and the set up a connection between the WLAN UE and the new Mobile Communication Network, whose connection state is set as non-activation. After disconnecting the connection between the WLAN UE and the accessed Mobile Communication Network, the established connection between the WLAN UE and the new Mobile Communication Network is to be activated at once, thus the time of disconnecting the user service connection can be reduced.

Figure 7:
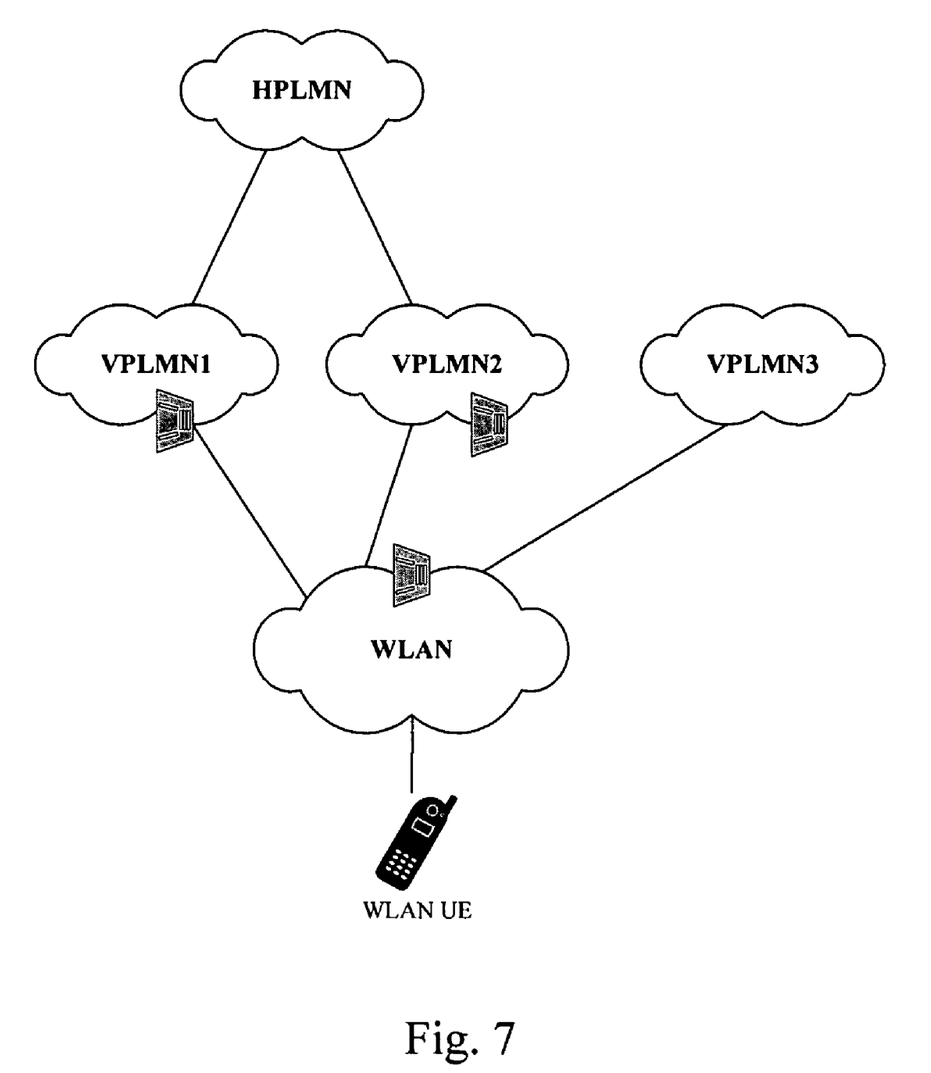
FIG. 7 is a schematic diagram illustrating the structure of a network in which a WLAN connected with a plurality of visited networks.

FIG. 7 shows a circumstance of a certain WLAN Access Network connecting three VPLMNs simultaneously. Suppose a WLAN UE has accessed VPLMN1 through the WLAN Access Network, and now the WLAN UE wants to switch from VPLMN1 to VPLMN2. Wherein, VPLMN1 corresponds to a former 3GPP AAA Agent and VPLMN2 corresponds to a new 3GPP AAA Agent. Now, the process of the WLAN UE reselecting a Mobile Communication Network to access will be illustrated in more detail hereinafter with reference to several embodiments and FIG. 7.

Embodiment 1

In this embodiment, after receiving the authentication request from VPLMN2, the Home Network implements an authentication operation directly; more over, after the authentication succeeds, the Home Network first sends an Access Permission message to VPLMN2 and then sends a Disconnection message to VPLMN1. Accordingly, the WLAN Access Network will receive the Access Permission message first. In addition, in the present embodiment, the current WLAN UE is permitted to access only one connection simultaneously; in this case, the process of the WLAN UE reselecting a Mobile Communication Network comprises the following steps:

Step 11: The current WLAN UE determines that it needs to access VPLMN2, and affirms the domain name or identity of VPLMN2.

Step 12: the WLAN UE sends an access authentication request to the WLAN Access Network without affecting the existing connection with VPLMN1, i.e. the WLAN UE sends an Authentication Start Packet EAPoL-Start to the WLAN Access Network.

Step 13-14: On receiving the access authentication request, the WLAN Access Network initiates an access authentication procedure, i.e. an EAP procedure, between the WLAN Access Network and the WLAN UE. Specifically, the WLAN Access Network sends a User Identity Packet EAPoL-Request [Identity] to the WLAN UE to request the user name of the current WLAN UE; after receiving the request packet, the WLAN UE returns a User Identity Response Packet EAPoL-Response [Identity] to the WLAN Access Network, which carries a user identity field with NAI format. Wherein, the user identity field carries network selection information; the packet can also carry identity information to identify this information is for network reselection.

Step 15: The WLAN Access Network confirms that the current WLAN UE select to access VPLMN2 according to an address information or identity information of VPLMN2 in the request, and VPLMN2 connects with the present WLAN, then the WLAN Access Network forwards the access authentication request from the WLAN UE to VPLMN2 and then the access authentication request is forwarded to the Home Network of the WLAN UE, and next the authentication procedure is implemented by the Home Network, specifically, all the authentication operations are completed by an AAA Server in the Home Network.

Step 16: After the Home Network of the current WLAN UE receives the authentication request, since the current WLAN UE connects with VPLMN1, the corresponding connection information exists in the Home Network, the Home Network judges and confirms that the authentication request from VPLMN2 is an authentication request from a newly selected Mobile Operation Network according to the existing information or Mobile Communication Network identity carried in the authentication request, and then the Home Network implements authentication for the authentication request from VPLMN2 directly.

In this step, the Home Network also needs to judge whether the current WLAN UE is permitted to access multiple VPLMNs simultaneously, if so, the Home Network can disconnect or keep the former connection in the subsequent steps; otherwise, the former connection will be disconnected. In the present embodiment, the current WLAN UE is not permitted to access multiple VPLMNs, so VPLMN1 and the WLAN UE will be disconnected in subsequent steps.

Step 17: If the authentication to the WLAN UE fails, an Access Rejection message will be sent to VPLMN2; or alternatively a re-authentication message will be sent to VPLMN1 and an Access Rejection message will be sent to VPLMN2 by the Home Network. After receiving the Access Rejection message from VPLMN2, the WLAN network informs the WLAN UE initiating the current request that the authentication fails, and then completes the current process of network reselection. Wherein, the Access Rejection message carries reasons of rejection, for example, a rejection reason value.

If the Home Network confirms to reject the authentication request of the current WLAN UE since it is from VPLMN2 according to the network access rules or user subscription information set in advance, for example, access rules of accessing more than one Mobile Communication Network by the WLAN UE simultaneously being not permitted, or accessing VPLMN2 by the WLAN UE being not permitted and so on, the Home Network sends an Access Rejection message to VPLMN2, and the connection between the Home Network and VPLMN1 will not be affected. After receiving the Access Rejection message from VPLMN2, the WLAN Access Network informs the WLAN UE that the authentication of reselecting Mobile Communication Network fails, and then completes the current process of network reselection.

If the authentication to the WLAN UE by the Home Network succeeds, proceeds to Step 18. In the present embodiment, suppose that the authentication for the WLAN UE by the Home Network succeeds.

Step 18: The Home Network sends an Access Permission message to VPLMN2, and since according to the network access rules or user subscription information, the WLAN UE is permitted to access only one connection simultaneously, the Home Network sends a Disconnection message to VPLMN1 later.

Step 19: After receiving the Access Permission message from VPLMN2 first, the WLAN Access Network collects charging information and then sends it to VPLMN1, and next disconnects the connection between the current WLAN UE and VPLMN1; and at the same time, the WLAN Access Network sets up a normal network connection between the WLAN UE and VPLMN2, and establishes corresponding charging relationship with VPLMN2 and thus the subsequent charging information will be sent to VPLMN2, and the process of operation network reselection of the WLAN UE is completed.

Embodiment 2

In this embodiment, after receiving the authentication request from VPLMN2, the Home Network implements authentication operation directly; and after the authentication succeeds, the Home Network sends an Access Permission message to VPLMN2 and at the same time sends a Disconnection message to VPLMN1; and then, the WLAN Access Network receives the Access Permission message first. In the present embodiment, the current WLAN UE is permitted to access only one connection or the WLAN UE indicates to switch from an existing connection to a new connection. In this case the procedure of the WLAN UE reselecting a Mobile Communication Network according to the present embodiment is basically the same as that of Embodiment 1, but Step 28 is different from Step 18 of Embodiment 1.

Step 21~27: These steps are exactly the same as that of Step 11~17 according to Embodiment 1.

Step 28: The Home Network sends an Access Permission message to VPLMN2 and at the same time sends a Disconnection message to VPLMN1.

Embodiment 3

In this embodiment, after receiving the authentication request from VPLMN2, the Home Network implements authentication operation directly and the authentication succeeds; more over, after the authentication succeeds, the Home Network sends an Access Permission message to VPLMN2 and at the same time sends a Disconnection message to VPLMN1; and then the WLAN Access Network receives the Disconnection message first. In the present embodiment, the current WLAN UE is permitted to access only one connection or the WLAN UE indicates to switch from an existing connection to a new connection. In this case, the procedure of the WLAN UE reselecting a Mobile Communication Network in the present embodiment is basically the same as that in Embodiment 1, while Step 38 and 39 are different from Step 18 and 19 of Embodiment 1.

Step 31~37: These steps are exactly the same as that of Step 11~17 according to Embodiment 1.

Step 38: The Home Network sends an Access Permission message to VPLMN2 and at the same time sends a Disconnection message to VPLMN1.

Step 39: After first receiving the Disconnection message from VPLMN1, the WLAN Access Network waits for the Access Permission message from VPLMN2, and after receiving the Access Permission message, the WLAN Access Network collects charging information and sends it to VPLMN1, and then disconnects the connection between the current WLAN UE and VPLMN1; next, the WLAN Access Network sets up a normal network connection for the WLAN UE and VPLMN2, and establishes a corresponding charging relationship with VPLMN2 and thus the subsequent charging information will be sent to VPLMN2, and the process of operation network reselection of the WLAN UE is completed.

Embodiment 4

In this embodiment, after receiving the authentication request from VPLMN2, the Home Network implements authentication operation directly and the authentication succeeds; more over, after and the authentication succeeds, the Home Network sends an Access Permission message to VPLMN2 and at the same time sends a Disconnection message to VPLMN1; the WLAN Access Network receives the Disconnection message generated due to authentication failure. In the present embodiment, the current WLAN UE is permitted to access only one connection or the WLAN UE indicates to switch from an existing connection to a new connection. In this case, the procedure of the WLAN UE reselecting a Mobile Communication Network in the present embodiment is basically the same as that in Embodiment 1, while Step 48 and 49 are different from Step 18 and 19 of Embodiment 1.

Step 41~47: These steps are exactly the same as that of Step 11~17 according to Embodiment 1.

Step 48: The Home Network sends an Access Permission message to VPLMN2 and at the same time sends a Disconnection message to VPLMN1.

Step 49: After the WLAN Access Network receiving the Disconnection message from VPLMN1, and the reason value carried in the message indicates that one Mobile Communication Network needs to be disconnected because of repeated connection, then the WLAN Access Network collects charging information first and sends it to VPLMN1, next, disconnects the connection between the current WLAN UE and VPLMN1, and then waits for the authentication result from VPLMN2; after receiving the Access Permission message from VPLMN2, the WLAN Access Network sets up a normal network connection for the WLAN UE and VPLMN2, and then establishes a corresponding charging relationship with VPLMN2 and thus the subsequent charging information will be sent to VPLMN2, and the process of operation network reselection of the WLAN UE is completed. Here, if the authentication result from VPLMN2 is not received, the WLAN Access Network may try to implement authentication once again, and times of trying or a period of time for trying over again can be set in advance, if the times of trying or the period of time for trying set in advance is reached, the authentication fails.

Embodiment 5

In the present embodiment, after receiving the authentication request from VPLMN2, the Home Network sends a Disconnection message to VPLMN1 first, and then implements authentication for the authentication request from VPLMN2. In this embodiment, the current WLAN UE is permitted to access only one connection simultaneously or the WLAN UE indicates to switch from an existing connection to a new connection. In this case, the procedure of the WLAN UE reselecting a Mobile Communication Network comprises the following steps:

Step 51~56: These steps are exactly the same as that of Step 11~16 according to Embodiment 1.

Step 57: The Home Network sends a Disconnection message to VPLMN1 requesting to disconnect the connection between VPLMN1 and the current WLAN UE; after receiving the Disconnection message sent from the Home Network and through VPLMN1, the WLAN Access Network disconnects with VPLMN1, which specifically comprises: collects charging information and then sends it to VPLMN1, disconnects the network connection, signaling connection and service connection between the current WLAN UE and VPLMN1, but does not disconnect the wireless connection between the current WLAN UE and VPLMN1; and then implements authentication to the authentication request from VPLMN2.

Step 58: After receiving the authentication result from VPLMN2, the WLAN Access Network judges whether the authentication is successful, if the authentication is successful, the WLAN Access Network establishes a signaling relationship, a charging relationship and an authentication relationship between the current WLAN UE and VPLMN2, and sets up a service connection between the current WLAN UE and VPLMN2, completing the network reselection process. Otherwise, the WLAN Access Network informs the current WLAN UE that the authentication is a failure and the authentication failure message may carry the failure reason value.

Embodiment 6

In this embodiment, the current WLAN UE is permitted to access multiple VPLMNs according to its user subscription information, and VPLMN2 selected by the WLAN UE is the second VPLMN the WLAN UE wants to access. After receiving the authentication request from VPLMN2, the Home Network implements authentication directly and the authentication succeeds. And after the authentication succeeds, the Home Network confirms that the current WLAN UE is permitted to implement multiple-connection access by judgment, and then the Home Network sends an Access Permission message to VPLMN2; after that the WLAN Access Network activates the connection from the WLAN UE to VPLMN2 and distributes the data of the WLAN UE to VPLMN1 or VPLMN2 according to different IP address or NAI used by the WLAN UE. The WLAN UE sends corresponding service data to different VPLMNs according to the selection of the user or the user application program. Thus the procedure of the WLAN UE reselecting Mobile Communication Network according to the present embodiment is basically the same as that in Embodiment 1, except that Step 68 and 69 are different from Step 18 and 19 of Embodiment 1.

Step 61~67: These steps are exactly the same as that of Step 11~17 according to Embodiment 1.

Step 68: Since the current WLAN UE is permitted to access multiple connections simultaneously, at the time the Home Network sends an Access Permission message to VPLMN2, it does not need to send a Disconnection message to VPLMN1.

Step 69: After receiving the Access Permission message from VPLMN2, the WLAN Access Network sets up a normal network connection for the WLAN UE and VPLMN2 and establishes a corresponding charging relationship with VPLMN2, thus the subsequent charging information will be sent to VPLMN1 or VPLMN2 according to user identity information, here, the user identity information includes NAI, IP address and so on. For example, if the user data use an IP address belonging to VPLMN1, the corresponding charging information will be sent to VPLMN1; if the identity of user data is of VPLMN2, the corresponding charging information will be sent to VPLMN2, and the process of the WLAN UE supporting multiple VPLMN networks is completed. Here, if the authentication result from VPLMN2 is not received, the WLAN Access Network may try to implement authentication once again, and times of trying or a period of time for trying can be set in advance. If the times of trying or the period of time for trying set in advance is reached, the authentication fails.

Embodiment 7

In this embodiment, the current WLAN UE is permitted to access multiple VPLMNs according to the user subscription information and a threshold of the maximum connection number simultaneously is set in advance, VPLMNn selected by the WLAN UE is the $n^{th}$ VPLMN the WLAN UE wants to access, and n exceeds the threshold of the maximum connection number simultaneously of the WLAN UE set in advance, after receiving the authentication request from VPLMNn, the Home Network can reject directly and explains in the rejection reason that the reason of rejection is access limit, and certain existing connections need to be removed by the WLAN UE; the Home Network can also directly accept the authentication request currently received and indicates the WLAN UE to select a connections to be removed after the authentication succeeds.

Step 71~77: These steps are exactly the same as that of Step 11~17 according to Embodiment 1.

Step 78: The Home Network judges whether the $n^{th}$ connection exceeds the threshold of the maximum connection number simultaneously of the WLAN UE, if dose not exceed, proceeds to the steps described in Step 68 and 69 of Embodiment 6; otherwise, the Home Network selects to reject or accept the request and implement authentication according to user subscription information or network configuration, and then indicates the WLAN UE to remove a certain existing connection.

Embodiment 8

In the present embodiment, the current WLAN UE is permitted to access multiple VPLMNs simultaneously according to the user subscription information, but the WLAN UE expects to switch from a certain existing connection to anther new connection. In this case, the existing connection can be deleted first, and then a new connection is established, as described in Embodiment 4; alternatively, a new connection can be tried to set up first, an if the new connection is set up successfully, the former connection deleted then, as described in Embodiment 1, 2 and 3; and in view of another substitute, while the new connection is set up, indicates the network in signaling the former connection to be deleted.

What are mentioned above are just some relatively preferred embodiments of the present invention, which are not intended to limit the protection range of the invention.

The invention claimed is:

1. An interactive method for a Wireless Local Area Network (WLAN) User equipment (UE) to access a new communication network, comprising:
    sending, by the WLAN UE that has accessed a first Visited Mobile Communication Network, authentication information to a Home Network of the WLAN UE through a WLAN Access Network and a second Visited Mobile Communication Network, if the WLAN UE is in need of access to the second Visited Mobile Communication Network;
    receiving, by the WLAN UE, either an Access Permission message or an Access Rejection message from the Home Network via the WLAN Access Network and the second Visited Mobile Communication Network, based on the Home Network having received the authentication information and having authenticated the WLAN UE according to the authentication information;
    accessing, by the WLAN UE, the second Visited Mobile Communication Network via the WLAN Access Network if the Access Permission message is received; and
    disconnecting the WLAN UE from a the first Visited Mobile Communication Network based on a disconnection message sent from the Home Network to the first Visited Mobile Communication Network, and
    wherein accessing the second Visited Mobile Communication Network comprises:
    establishing, by the WLAN UE, a connection between the WLAN UE and the second Visited Mobile Communication Network, if the WLAN Access Network determines that the Access Permission message is received, otherwise, receiving, by the WLAN UE, the Access Rejection message from the WLAN Access Network.

2. The method according to claim 1, further comprises the step of:
    receiving, by the WLAN UE, from the Home Network a Disconnection message from the first Visited Mobile Communication Network when the WLAN Access Network determines that the WLAN UE is not permitted simultaneous access to more than one Visited Mobile Communication Network, otherwise the WLAN UE remains connected to the first Visited Mobile Communications Network after accessing the second Visited Mobile Communication Network.

3. The method according to claim 2, wherein, if the WLAN UE is-permitted to access more than one Visited Mobile Communication Network simultaneously and the Home Network of the WLAN UE has decided not to send the Disconnection message to the first Visited Mobile Communication Network, the WLAN UE is re-authenticated via the first Visited Mobile Communication Network and/or the WLAN UE receiving advertisement information to inform the WLAN UE that more than one connection exists.

4. The method according to claim 3, wherein the step of receiving the advertisement information comprises:
    receiving, by the WLAN UE, a notification via an existing connection, or via a newly established connection.

5. The method according to claim 4, wherein the notification comprises at least one of:
    an indication of a total number of current connections; and
    specific selection information of the current connections.

6. The method according to claim 2, wherein a threshold of a maximum number of permitted simultaneous connections of the WLAN UE is preset, and
    wherein, if the WLAN UE is permitted to access more than one Visited Mobile Communication Network simultaneously and the Home Network determines that a number of current simultaneous connections exceeds the threshold of the maximum number of permitted simultaneous connections, the WLAN UE receiving the Access Rejection message from the Home Network via the WLAN Access Network and the second Visited Mobile Communication Network or the authentication is performed and the WLAN UE receiving an instruction to disconnect one or more than one existing connection.

7. The method according to claim 1, wherein the Access Rejection message carries information indicating a reason for rejection.

8. An interactive method for a Wireless Local Area Network (WLAN) User equipment (UE) to access a new communication network, comprising:
    sending, by the WLAN UE that has accessed a first Visited Mobile Communication Network, authentication information to a Home Network of the WLAN UE through a WLAN Access Network and a second Visited Mobile Communication Network, if the WLAN UE is in need of access to the second Visited Mobile Communication Network;
    receiving, by the WLAN UE, either an Access Permission message or an Access Rejection message from the Home Network via the WLAN Access Network and the second Visited Mobile Communication Network, based on the Home Network having received the authentication information and having authenticated the WLAN UE according to the authentication information;
    accessing, by the WLAN UE, the second Visited Mobile Communication Network via the WLAN Access Network if the Access Permission message is received;
    wherein, after the authentication of the WLAN UE succeeds,
    sending, by the Home Network, the Access Permission message to the WLAN Access Network via the second Visited Mobile Communication Network, and
    wherein accessing the second Visited Mobile Communication Network comprises:
    establishing, by the WLAN Access Network, a connection between the WLAN UE and the second Visited Mobile Communication Network, and disconnecting a connection between the WLAN UE and the first Visited Mobile Communication Network.

9. The method according to claim 8, further comprising the steps of:

the WLAN Access Network determines whether the WLAN UE is permitted to access more than one Visited Mobile Communication Network simultaneously, and if permitted, the WLAN Access Network determining whether to send the Disconnection message to the first Visited Mobile Communication Network;

otherwise if not permitted, the WLAN Access Network disconnecting the connection between the WLAN UE and the first Visited Mobile Communication Network.

10. The method according to claim 9, wherein, if the WLAN UE is permitted to access more than one Visited Mobile Communication Network simultaneously and the Home Network of the WLAN UE has decided not to send the Disconnection message to the first Visited Mobile Communication Network, the WLAN UE is re-authenticated via the first Visited Mobile Communication Network and/or the WLAN UE receiving advertisement information to inform the WLAN UE that more than one connection exists.

11. The method according to claim 9, wherein a threshold of a maximum number of permitted simultaneous connections of the WLAN UE is preset, and wherein, if the WLAN UE is permitted to access more than one Visited Mobile Communication Network simultaneously and the Home Network determines that a number of-current simultaneous connections exceeds the threshold of the maximum number of permitted simultaneous connections, the WLAN UE receiving the Access Rejection message from the Home Network via the WLAN Access Network and the second Visited Mobile Communication Network or the authentication is performed and the WLAN UE receiving an instruction to disconnect one or more than one existing connection.

12. The method according to claim 11, wherein after the WLAN UE receives the instruction to disconnect one or more than one connection, a corresponding accessed Visited Mobile Communication Network is disconnected or the connection between the WLAN UE and the second Visited Mobile Communication Network is rejected according to a correlative selection information.

13. An interactive method for a Wireless Local Area Network (WLAN) User equipment (UE) to access a new communication network, comprising:

sending, by the WLAN UE that has accessed a first Visited Mobile Communication Network, authentication information to a Home Network of the WLAN UE through a WLAN Access Network and a second Visited Mobile Communication Network, if the WLAN UE is in need of access to the second Visited Mobile Communication Network;

receiving, by the WLAN UE, either an Access Permission message or an Access Rejection message from the Home Network via the WLAN Access Network and the second Visited Mobile Communication Network, based on the Home Network having received the authentication information and having authenticated the WLAN UE according to the authentication information;

accessing, by the WLAN UE, the second Visited Mobile Communication Network via the WLAN Access Network if the Access Permission message is received, wherein when the authentication of the WLAN UE fails sending, by the Home Network, the Access Rejection message to the WLAN Access Network via the second Visited Mobile Communication Network, and wherein accessing the second Visited Mobile Communication Network comprises:

forwarding, by the WLAN Access Network, the Access Rejection message to the WLAN UE according to the received Access Rejection message.

14. The method according to claim 13, wherein, when the authentication of the WLAN UE fails, the method further comprises the steps of:

sending, by the Home Network, a Disconnection message to the WLAN Access Network via the first Visited Mobile Communication Network, and wherein accessing the second Visited Mobile Communication Network comprises:

disconnecting, by the WLAN Access Network, a connection between the WLAN UE and the first Visited Mobile Communication Network according to the received Disconnection message.

15. An interactive method for a Wireless Local Area Network (WLAN) User equipment (UE) to access a new communication network, comprising:

sending, by the WLAN UE that has accessed a first Visited Mobile Communication Network, authentication information to a Home Network of the WLAN UE through a WLAN Access Network and a second Visited Mobile Communication Network, if the WLAN UE is in need of access to the second Visited Mobile Communication Network;

receiving, by the WLAN UE, either an Access Permission message or an Access Rejection message from the Home Network via the WLAN Access Network and the second Visited Mobile Communication Network, based on the Home Network having received the authentication information and having authenticated the WLAN UE according to the authentication information; and accessing, by the WLAN UE, the second Visited Mobile Communication Network via the WLAN Access Network if the Access Permission message is received, wherein, when the authentication of the WLAN UE fails, sending, by the Home Network, the Access Rejection message to the WLAN Access Network via the second Visited Mobile Communication Network, and sending a Re-authentication Request to the WLAN Access Network via the first Visited Mobile Communication Network, and wherein accessing the second Visited Mobile Communication Network comprises:

receiving, by the WLAN UE, from the WLAN Access Network the Access Rejection message according to the Access Rejection message received by the WLAN Access Network, and re-authenticating to a Re-authentication Request from the first Visited Mobile Communication Network.

16. An interactive method for a Wireless Local Area Network (WLAN) User equipment (UE) to access a new communication network, comprising:

sending, by the WLAN UE that has accessed a first Visited Mobile Communication Network, authentication information to a Home Network of the WLAN UE through a WLAN Access Network and a second Visited Mobile Communication Network, if the WLAN UE is in need of access to the second Visited Mobile Communication Network;

receiving, by the WLAN UE, either an Access Permission message or an Access Rejection message from the Home Network via the WLAN Access Network and the second Visited Mobile Communication Network, based on the Home Network having received the authentication information and having authenticated the WLAN UE according to the authentication information; and accessing, by the WLAN UE, the second Visited Mobile Communication Network via the WLAN Access Network if the Access Permission message is received, wherein, when the authentication of the WLAN UE fails, sending, by the Home Network, a Re-authentication Request message to the WLAN Access Network via the second Visited Mobile Communication Network, and wherein accessing the second Visited Mobile Communication Network comprises:

re-authenticating by the WLAN Access Network, the Re-authentication Request from the second Visited Mobile Communication Network.

17. An interactive method for a Wireless Local Area Network (WLAN) User equipment (UE) to access a new communication network, comprising:

sending, by the WLAN UE that has accessed a first Visited Mobile Communication Network, authentication information to a Home Network of the WLAN UE through a WLAN Access Network and a second Visited Mobile Communication Network, if the WLAN UE is in need of access to the second Visited Mobile Communication Network;

receiving, by the WLAN UE, either an Access Permission message or an Access Rejection message from the Home Network via the WLAN Access Network and the second Visited Mobile Communication Network, based on the Home Network having received the authentication information and having authenticated the WLAN UE according to the authentication information; and accessing, by the WLAN UE, the second Visited Mobile Communication Network via the WLAN Access Network if the Access Permission message is received, wherein accessing the second Visited Mobile Communication Network comprises:

informing, by the WLAN Access Network, the second Visited Mobile Communication Network to complete resource distribution and parameter configuration;

establishing, by the WLAN Access Network, a connection between the WLAN UE and the second Visited Mobile Communication Network, and setting the state of the connection as non-activation; and after disconnecting, by the WLAN Access Network, a connection between the WLAN UE and the first Visited Mobile Communication Network, activating, by the WLAN Access Network, the established connection between the WLAN UE and the second Visited Mobile Communication Network.

* * * * *